April 22, 1924.
F. BLACKBURN
TRUCK
1,491,025
Original Filed Sept. 23, 1918    2 Sheets-Sheet 1
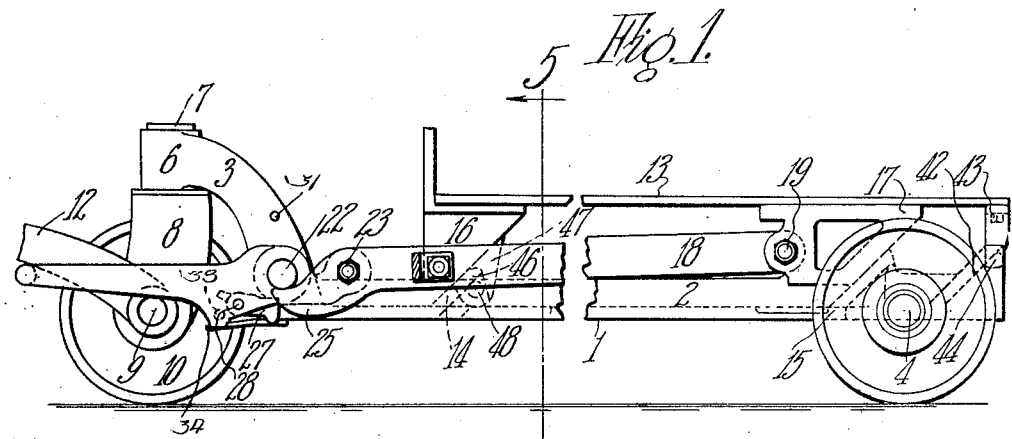
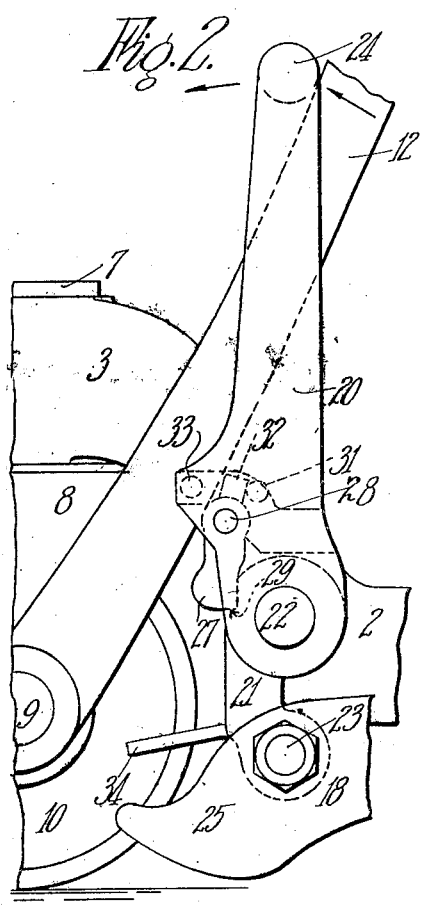
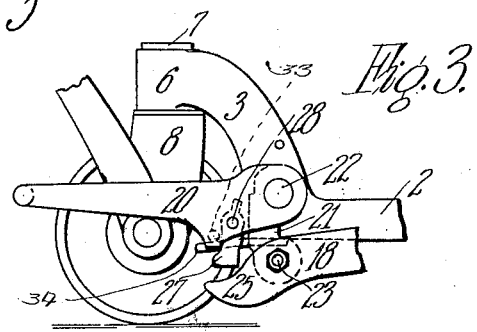
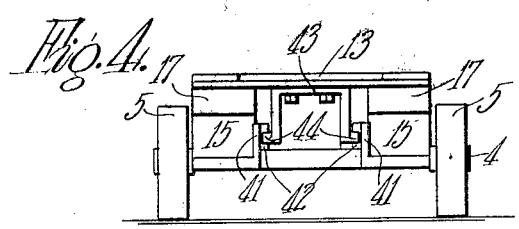
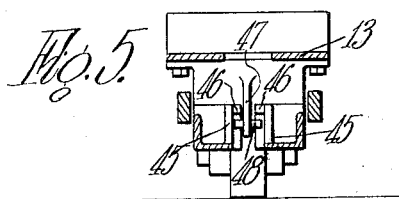
INVENTOR.
Felix Blackburn.
BY Chapin + Neal
ATTORNEYS.

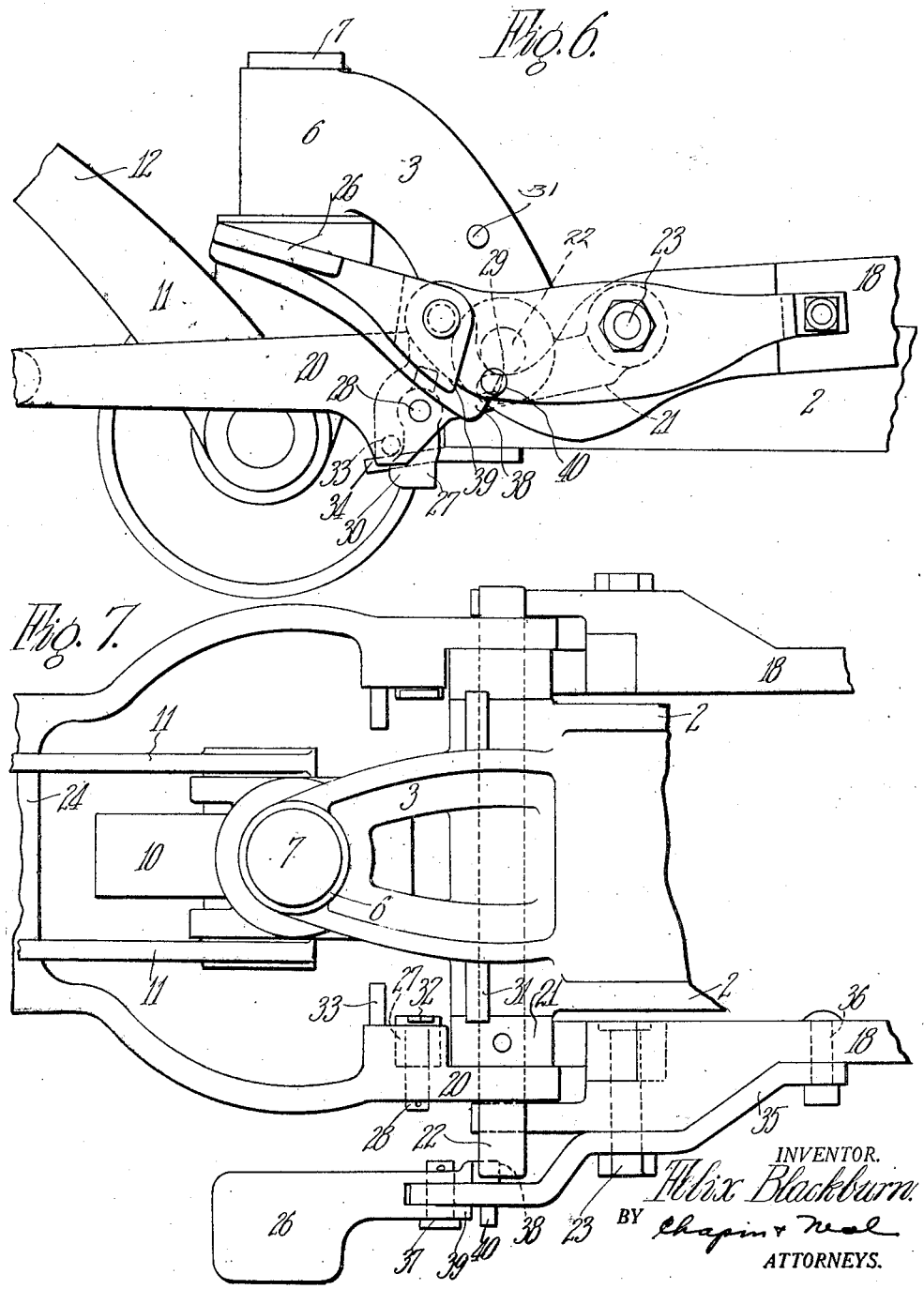

Patented Apr. 22, 1924.

1,491,025

UNITED STATES PATENT OFFICE.

FELIX BLACKBURN, OF FEEDING HILLS, MASSACHUSETTS, ASSIGNOR TO J. LEWIS WYCKOFF, EDWARD N. WHITE, AND GEORGE F. JENKS, ALL OF HOLYOKE, MASSACHUSETTS, TRUSTEES, DOING BUSINESS AS THE COWAN TRUCK COMPANY.

TRUCK.

Application filed September 28, 1918, Serial No. 255,233. Renewed February 26, 1921. Serial No. 448,077.

*To all whom it may concern:*

Be it known that I, FELIX BLACKBURN, a subject of the King of Great Britain, residing at Feeding Hills, in the county of Hampden and State of Massachusetts, have invented certain new and useful Improvements in Trucks, of which the following is a specification.

My invention relates to trucks and more particularly to elevating trucks of the type disclosed in U. S. patents to G. P. Taylor Nos. 1,121,052; 1,122,439; and 1,202,242, granted, respectively, December 15, 1914, December 29, 1914, and October 24, 1916. Trucks of this type have proved themselves in widely extended use to have many features of advantage, and the object of my invention is to improve this type of truck while retaining the features of the truck which have made it so successful in use.

More particularly, my invention has for its object the provision, in a truck of the above type, of means for operating the toggle mechanism, which means will permit of the free and unrestricted use of the handle for drawing purposes while the truck platform is lowered, without in any way interfering with, or necessitating an alteration in, the simple handle and yoke construction used in trucks of this type.

Other objects and advantages of my invention will appear as this description proceeds.

In the accompanying drawings—

Fig. 1 is a side elevation of a truck embodying my invention, a portion of the handle and of the central portion of the truck being broken away to economize space and the trip mechanism being omitted for the sake of clearness;

Fig. 2 is a view of the yoke and handle in raised position and the platform in lowered position, the trip mechanism being omitted;

Fig. 3 is a view with the platform in lowered position and the yoke in lowered position also, the trip mechanism being omitted;

Fig. 4 is a rear view;

Fig. 5 is a cross-section substantially on line 5—5 of Fig. 1;

Fig. 6 is a side elevation more particularly illustrating the trip mechanism; and Fig. 7 is a top view of the parts illustrated in Fig. 6.

Referring now to the drawings, and in a general way to said patents: The truck proper, or base 1, comprises a generally triangular frame composed of rigidly connected side bars 2, 2, and a bracket 3. At their rear ends, the bars support the axle 4 for the wheels 5, 5, while at the forward end of the frame the bracket 3 carries a sleeve 6 in which is swivelled the spindle 7 of a fork 8 within which is mounted, on the axle 9, the forward or caster wheel 10. The said axle 9 is extended sufficiently at each side of the caster wheel so that bifurcations 11 of a handle 12 may have bearing on the axle. Thus, the handle is mounted for upward and downward swinging about the axle 9.

The base 1 carries the vertically shiftable platform 13 which directly carries the load. This platform may be mounted for its vertical movement in any suitable manner. As here illustrated, there are provided an inclined slide-way block 14 at the forward end of the truck and a pair of similar blocks 15, 15, at the rear of the truck with their slideways extending upward and rearwardly. The platform carries cooperating blocks 16 and 17, 17, so that, as the platform is moved rearwardly, it will rise and vice versa. To give this motion to the platform, a toggle mechanism is provided and preferably duplicated at each side of the truck. In those cases in which a complete toggle mechanism is used at one side of the truck only, I find it highly desirable to duplicate the section 20 of the lever 20—21, and its pivot 22, mentioned below, at the other side, in order to furnish a sturdy bracing structure for the section 20 and cross bar 24 of the complete toggle mechanism at the said one side.

As here illustrated, a toggle mechanism comprises a reach link 18 pivoted at 19 to the rear of the platform and a lever 20—21 (see Fig. 2) fulcrumed by a pivot pin 22 to the bracket 3 and pivoted to the reach link by the pin 23. The two levers 20—21, one at each side of the truck, at their outer ends conveniently provide a cross member 24 to form a species of yokes, with the member 24 in cooperative relation with the handle 12 so that, as the handle is lowered, the levers 20—21 will be carried down by it. As described below each lever 20—21 is in two sections, but upon its downward movement functions as a single rigid piece. To raise the platform, the handle 12 is pressed forwardly and downwardly, whereby the lever 20—21 is lowered. This raises the end 21, carrying upward the pin 23 which moves the reach link 18 rearwardly and slides the platform upward along its ways. The linkage is so proportioned that, when the platform arrives at its raised position, the central longitudinal axis of the pin 23 lies a little above the line of dead center connecting the like axes of the pins 19 and 22. The reach link 18 is extended beyond the pin 23 to provide a hook 25, which, when the platform is in raised position, fits about the pin 22 and prevents further upward swing of the part 21. Thus, when the platform is in raised position, the toggle is locked, and the platform can be lowered only by in some manner breaking the toggle. When the platform is in its raised position, the yoke 20, 24 is in its lower horizontal position and permits the free up-and-down movement of the handle 12 in steering and drawing the truck.

The toggle may be broken by any convenient means, and I illustrate one such means, indicated generally at 26 (Figs. 6 and 7), and will later describe the same; but, having described the illustrated truck and its operation in a general way, I shall now describe the mechanism which more particularly embodies my invention.

Each lever 20—21 is composed of two sections, each pivotally carried upon the pin 22 for independent oscillation thereabout. The section 20 has a pawl 27 pivoted on it at 28, while the hub of section 21 presents a notch 29 (Fig. 2) for the pawl, the parts being so contoured that the pawl 27 fits securely in the notch under the lifting pressure so, when the section 20 is swung downward, the section 21 is turned about the pivot 22 to move the pin 23 upward and raise the platform. To insure this, the bottoms of the pawl and the notch are shaped to slant slightly downward to the right when in the position (Fig. 2) but when in position (Fig. 6) are disposed vertically so that the nose of the pawl is free to drop out of engagement from the notch. After the sections have reached "platform raised" position the pawl may free itself from the notch (Fig. 6) and the section 20 is freed from active cooperation with the section 21. Should, as is common, the weight of the lowered section 20, unsuplemented by any lifting pressure on the pawl, tend to keep the pawl in frictional engagement with its notch 29, the operator will, at the completion of the raising, kick the section 20 slightly upward to release the pawl and permit the pawl's weighted toe 30 to drop out of engagement with its notch 29. The foregoing mechanism in effect constitutes clutching means between the swinging member 20 and the section 21 of the elevating means whereby the same may be connected or disconnected at the will of the operator.

With the arrangement just described, it will be seen that the truck platform can be lowered without in any way actuating the section 20; the only effect when the toggle is broken will be to move the section 21. Thus, the platform can be lowered and remain lowered while the section 20 is in its lowered position wholly removed from interference with the handle 12. Furthermore, the handle 12 is free to swing up and down in drawing and steering the truck while the platform is in lowered position in the same manner as when the platform is in its upper position. In the present construction it becomes wholly unnecessary for the truck operator to raise the platform in order that he may use the handle for drawing and steering the truck as is the case with the trucks in the patents previously mentioned.

Moreover, since the section 20 is not carried upward when the platform is lowered, all danger of injury to the operator, by the yoke throwing rapidly upward carrying the handle with it, is wholly eliminated. With the present arrangement, when the operator wishes to again raise the platform, he merely manually moves the section 20 back to upright position, whereupon the pawl 27 re-engages in the notch 29, and the device is in position for again raising the platform.

If desired, a pin 31 may be provided on the bracket 3 and in position to engage rear of an arm 32 rigidly connected with the pawl 27, which is arranged to strike said arm at the end of the upward swing of section 20 and so insure the seating of the pawl in the notch 29. Also, it is desirable to provide some means to prevent the section 20, after the pawl has dropped from the notch, from swinging about the pin 22 much beyond horizontal position or until the forward end of the section would strike the ground. To this end, I provide the pin 33 on the section 20 which, when the section 20 is lowered and the pawl 27 is depressed, rests upon an extension 34 projecting from the truck frame (see Fig. 6).

The toggle breaking means here illustrated, conveniently is foot-operated. As here shown, more particularly in Figs. 6 and 7, an angle bracket 35 is rigidly carried by the reach link 18, being secured thereto by the bolt 36 and the pivot pin 23. Forward of pin 22, the bracket 35 carries the bifurcated foot pedal 26 pivoted thereto by the pin 37, one toe 38 of the pedal being so located as to underlie the extended end of the pivot pin 22 when the parts are in "platform raised" position. The other toe, 39, of the pedal, when the parts are in lowered position, contacts with a pin 40 carried by the bracket 35 to thereby prevent the pedal swinging so far about the pivot 37 that the toe 39 will come to a position where it will not be brought into contact with the lower side of the pin 22 when the parts are being moved to "platform raised" position. The pin 40 is, of course, so located as to not interfere with proper toggle-breaking relative movement between the pedal and the bracket 35.

With the arrangement described, when the parts are in raised position, as indicated in Fig. 6, and downward pressure is applied to the pedal, the toe 38 bears on the pin 22 as a fulcrum, and the pedal acts as a lever to pry the forward end of the reach link 18 downwardly, and hence the pivot pin 23, downwardly. This movement brings the pivot pin 23 below the "line of dead center" between the pin 22 and the pin 19 and so breaks the toggle. The toggle broken, the platform immediately descends to lowered position. Oil-cylinder checks, and similar devices, for controlling the lowering of the platform are, of course, old in the art and may be employed, if desired.

The provision of a toggle breaking mechanism, exemplified by that shown, is particularly valuable in combination with mechanism of the character of lever 20—21, as the lever 20—21, as here illustrated, is not adapted for use in lowering the truck platform.

As illustrated, more particularly in Figs. 1, 4, and 5, means are desirably provided for insuring that the slideway blocks carried by the platform will not lose contact with the cooperating blocks on the frame. As illustrated in Figs. 1 and 4, the rear of the frame carries two spaced members 41, 41, which present each an overhung inclined plane 42, while the platform carries a member 43 presenting two tracker pieces 44, 44, each underlying a respective adjacent inclined plane 41. Thus, the rear of the platform is prevented from rising from the blocks 15, 15. As shown in Figs. 1 and 5, the forward slideway block 14 is in the character of two separated members 45, 45, each presenting an overhung inclined plane 46, while a projection 47, carried by the platform, carries a cross-pin 48 which at its ends underlies the inclined planes 46, 46. Thus, the forward end of the platform is prevented from rising from the block 14.

It will be seen that I have provided a simple elevating truck which can be conveniently drawn by its handle when the platform is lowered and in which the "Taylor" type of truck is improved while the advantages thereof are retained, and that I have accomplished the objects of my invention.

Having thus described my invention, what I claim as new and desire to secure by Letters Patent is:—

1. A truck provided with a handle and comprising the combination with the latter of an upwardly movable platform, and a toggle mechanism having operative relation to said handle and operable by said handle to raise said platform, said toggle mechanism being adapted to be maintained in position to lock said platform in raised position by the load imposed on said platform; said toggle mechanism including an operating means for optional connection with said handle to be actuated thereby to place the platform in raised position, such means being in the character of an element comprising two sections, one for optional cooperation with said handle and the other related primarily to the elements of the toggle, and means operable independently of said handle and for connecting said sections to act as a unit when raising the platform and for disconnecting said sections upon the completion of the raising of the platform; whereby said platform can be lowered without actuation of the said one section and said handle can be manipulated freely without interference from such section when said platform is in lowered position; substantially as described.

2. A truck provided with a handle and comprising the combination with the latter of an upwardly movable platform, and a toggle mechanism having operative relation to said handle and operable by said handle to raise said platform, said toggle mechanism being adapted to be maintained in position to lock said platform in raised position by the load imposed on said platform; said toggle mechanism including an operating means for optional connection with said handle to be actuated thereby to place the platform in raised position, such means being in the character of an element comprising two sections, one for optional cooperation with said handle and the other related primarily to the elements of the toggle, and a connecting means between said sections in the character of a pawl and a ratchet-notch operable independently of said handle and arranged for connecting said sections to act as a unit when raising the platform and disconnecting said sections upon the completion of the raising of the platform; whereby said platform can be lowered without actuation of the said one section and said handle can be manipulated freely without interference from such section when said platform is in lowered position: substantially as described.

3. A truck including a frame and provided with a handle and comprising the combination with the latter of an upwardly movable platform and a toggle mechanism having operative relation to said handle and operable by said handle to raise said platform, said toggle mechanism being adapted to be maintained in position to lock said platform in raised position by the load imposed on said platform; said toggle mechanism including an operating means for optional connection with said handle to be actuated thereby to place the platform in raised position, such means being in the character of an element comprising two sections fulcrumed upon a pivot, a pivot therefor carried by said frame, one of said sections being primarily for optional cooperation with said handle and the other section being primarily related to the elements of the toggle, and means operable independently of said handle and for connecting said sections comprising a pawl carried by one of said sections, the other said section having a pawl-receiving notch, said pawl and notch being relatively arranged to provide that when the mechanism is in position to raise the platform said pawl operatively rests in said notch and when the raising of the platform is completed said pawl is operatively disconnected from said notch to thereby operatively disconnect said sections; whereby said platform can be lowered without actuation of the said one section and said handle can be manipulated freely without interference from such section when said platform is in lowered position; substantially as described.

4. A truck provided with a handle and comprising the combination with the latter of an upwardly movable platform and a toggle mechanism having operative relation to said handle and operable by said handle to raise said platform, said toggle mechanism being adapted to be maintained in position to lock said platform in raised position by the load imposed on said platform; said toggle mechanism including an operating means for optional connection with said handle to be actuated thereby to place the platform in raised position, such means being in the character of an element comprising two sections, one for optional cooperation with said handle and the other related primarily to the elements of the toggle, and means operable independently of said handle and for connecting said sections to act as a unit when raising the platform and for disconnecting said sections upon the completion of the raising of the platform; whereby said platform can be lowered without actuation of the said one section and said handle can be manipulated freely without interference from such section when said platform is in lowered position; and means for insuring the reconnection of said sections upon the return of the platform raising mechanism to initial position; substantially as described.

5. A truck provided with a handle and comprising the combination with the latter of an upwardly movable platform and a toggle mechanism having operative relation to said handle and operable by said handle to raise said platform, said toggle mechanism being adapted to be maintained in position to lock said platform in raised position by the load imposed on the platform; said toggle mechanism including an operating means for optional connection with said handle to be actuated thereby to place the platform in raised position, such means being in the character of an element comprising two sections, one for optional cooperation with said handle and the other related primarily to the elements of the toggle, and a connecting means between said sections and operable independently of said handle and in the character of a pawl and a ratchet-notch and arranged for connecting said sections to act as a unit when raising the platform and disconnecting said sections upon the completion of the raising of the platform; whereby said platform can be lowered without actuation of the said one section and said handle can be manipulated freely without interference from such section when said platform is in lowered position; and means for insuring the engagement of said pawl in the ratchet-notch upon the return of the platform raising mechanism to original position; substantially as described.

6. A truck provided with a handle and comprising the combination with the latter of an upwardly movable platform and a toggle mechanism having operative relation to said handle and operable by said handle to raise said platform, a device in the character of a pivot for said handle, said handle being connected with said device and non-shiftable toward or from its pivotal axis, said toggle mechanism being adapted to be maintained in position to lock said platform in raised position by the load imposed on said platform; said toggle mechanism including an operating means for connection with said handle to be actuated thereby to place the platform in raised position, such means being in the character of an element comprising two sections, one for cooperation with said handle and the other related primarily to the elements of the toggle, and means for connecting said sections to act as a unit when raising the platform and for disconnecting said sections upon the completion of the raising of the platform; whereby said platform can be lowered without actuation of the said one section and said handle can be manipulated freely without interference from such section when said platform is in lowered position; substantially as described.

7. A truck provided with a handle and comprising the combination with the latter of an upwardly movable platform and a toggle mechanism having operative relation to said handle and operable by said handle to raise said platform, said toggle mechanism being adapted to be maintained in position to lock said platform in raised position by the load imposed on said platform; said toggle mechanism including an operating means for connection with said handle to be actuated thereby to place the platform in raised position, such means being in the character of an element comprising two sections, one for cooperation with said handle and the other related primarily to the elements of the toggle, and means for connecting said sections to act as a unit when raising the platform and for disconnecting said sections upon the completion of the raising of the platform; whereby said platform can be lowered without actuation of the said one section and said handle can be manipulated freely without interference from such section when said platform is in lowered position; and a trip mechanism for breaking said toggle to lower said platform; substantially as described.

8. A truck provided with a handle and comprising the combination with the latter of an upwardly movable platform and a toggle mechanism having operative connection with said handle and operable by said handle to raise said platform, said toggle mechanism being adapted to be maintained in position to lock said platform in raised position by the load imposed on said platform; said toggle mechanism including an operating means for connection with said handle to be actuated thereby to place the platform in raised position, such means being in the character of an element comprising two sections, one for cooperation with said handle and the other related primarily to the elements of the toggle, and means for connecting said sections to act as a unit when raising the platform and for disconnecting said sections upon the completion of the raising of the platform; whereby said platform can be lowered without actuation of the said one section and said handle can be manipulated freely without interference from such section when said platform is in lowered position; and a tripping means to trip and release said toggle to lower the platform and comprising a foot treadle in position for convenient access by the foot; substantially as described.

9. In an elevating truck, in combination, supporting and steering wheels, a steering handle pivotally connected with said steering wheel for up-and-down movement, a lifting frame, elevating means therefor, means for operating said elevating means from said handle comprising a swinging member pivoted rearwardly of said handle and having a portion extending in front of said handle for operation thereby, and means engageable or disengageable at the will of the operator for effecting a connection between said swinging member and said elevating means.

10. In an elevating truck, in combination, supporting and steering wheels, a steering handle pivotally connected with said steering wheel for up-and-down movement, a lifting frame, elevating means therefor, means for operating said elevating means from said handle comprising a swinging member arranged for operative engagement with the front side of said handle, and clutching means operable by a movement of said swinging member to connect the swinging member with said elevating means when the platform is down and to disconnect said swinging member from said elevating means when the platform is up.

11. In an elevating truck in combination, a base frame having steering and supporting wheels, a platform mounted on said frame for up and down movement, a steering handle having an up and down swinging movement, elevating means for said platform comprising a yoke member pivoted on said frame and extending in front of said handle for operation thereby, and means for connecting said yoke member with said elevating means for elevating said platform and disconnecting said yoke member from said elevating means in lowering said platform.

12. In an elevating truck in combination, a base frame having steering and supporting wheels, a platform mounted on said frame for up and down movement, a steering handle having an up and down swinging movement, elevating means for said platform comprising a yoke member pivoted on said frame and extending in front of said handle for operation thereby, means for connecting said yoke member with said elevating means for elevating said platform and disconnecting said yoke member from said elevating means in lowering said platform, and means capable of operation independently of said yoke member for effecting the lowering of said platform.

13. In an elevating truck in combination, a base frame having steering and supporting wheels, a platform mounted on said frame for up and down movement, a steering handle having an up and down swinging movement, elevating means for said platform comprising a yoke member pivoted on said frame and extending in front of said handle for operation thereby, means for connecting said yoke member with said elevating means for elevating said platform and disconnecting said yoke member from said elevating means in lowering said platform, and foot operated trip means capable of operation independently of said yoke member for effecting the lowering of said platform.

14. In an elevating truck in combination, a base frame having steering and supporting wheels, a platform mounted on said frame for up and down movement, a steering handle having an up and down swinging movement, elevating means for said platform comprising a yoke member extending in front of said handle for operation thereby, said yoke member being pivoted on said base frame for swinging from vertical to horizontal position in elevating said platform, and means acting when said yoke member is in vertical position to automatically connect the same to said elevating means and acting when said yoke member is in horizontal position to automatically disconnect the same from said elevating means.

15. In an elevating truck in combination, a base frame having steering and supporting wheels, a platform mounted on said frame for up and down movement, a steering handle having an up and down swinging movement, elevating means for said platform comprising a yoke member extending in front of said handle for operation thereby, said yoke member being pivoted on said base frame for swinging from vertical to horizontal position in elevating said platform, and means comprising coacting pawl and notch portions acting when said yoke member is in vertical position to automatically connect the same to said elevating means and acting when said yoke member is in horizontal position to automatically disconnect the same from said elevating means.

16. In an elevating truck in combination, a base frame having steering and supporting wheels, a platform mounted on said frame for up and down movement, a steering handle having an up and down swinging movement, elevating means for said platform comprising a yoke member pivoted on said frame and extending in front of said handle for operation thereby, and means comprising coacting pawl and notch portions for connecting said yoke member with said elevating means for elevating said platform and disconnecting said yoke member from said elevating means in lowering said platform.

17. In an elevating truck in combination, a base frame having steering and supporting wheels, a platform mounted on said frame for up and down movement, a steering handle having an up and down swinging movement, elevating means for said platform comprising a yoke member pivoted on said frame and extending in front of said handle for operation thereby, and means for connecting or disconnecting at the will of the operator said yoke member with said elevating means.

18. In an elevating truck in combination, a base frame having steering and supporting wheels, a platform mounted on said frame for up and down movement, a steering handle having an up and down swinging movement, elevating means for said platform comprising a yoke member pivoted on said frame and extending in front of said handle for operation thereby, and means for detachably connecting said yoke member with said elevating means comprising coacting pawl and notch portions.

19. In an elevating truck in combination, a base frame having steering and supporting wheels, a platform mounted on said frame for up and down movement, a steering handle having an up and down swinging movement, elevating means for said platform comprising a yoke member pivoted on said frame and extending in front of said handle for operation thereby, and detachably connecting means between said yoke member and said elevating means arranged to be disengaged when said platform is up, whereby said platform may be lowered without movement of said yoke member.

20. In an elevating truck in combination, a base frame having steering and supporting wheels, a platform mounted on said frame for up and down movement, a steering handle having an up and down swinging movement, elevating means for said platform comprising a yoke member pivoted on said frame and extending in front of said handle for operation thereby, detachably connecting means between said yoke member and said elevating means arranged to be disengaged when said platform is up, whereby said platform may be lowered without movement of said yoke member, and trip mechanism acting independently of said yoke member for effecting the lowering of said platform.

21. In an elevating truck in combination, a base frame having steering and supporting wheels, a platform mounted on said frame for up and down movement, a steering handle having an up and down swinging movement, elevating means for said platform comprising a toggle mechanism for holding said platform in elevated position and a yoke member pivoted on said frame and extending in front of said handle for operation thereby, means for detachably connecting said yoke member with said elevating means to permit lowering of said platform without movement of said yoke member, and means independent of said yoke member for tripping said toggle holding mechanism.

FELIX BLACKBURN.